Nov. 19, 1968          A. R. BIEDESS                3,411,676
                    LOAD TRANSFER DEVICE
Filed July 19, 1967                          4 Sheets-Sheet 4

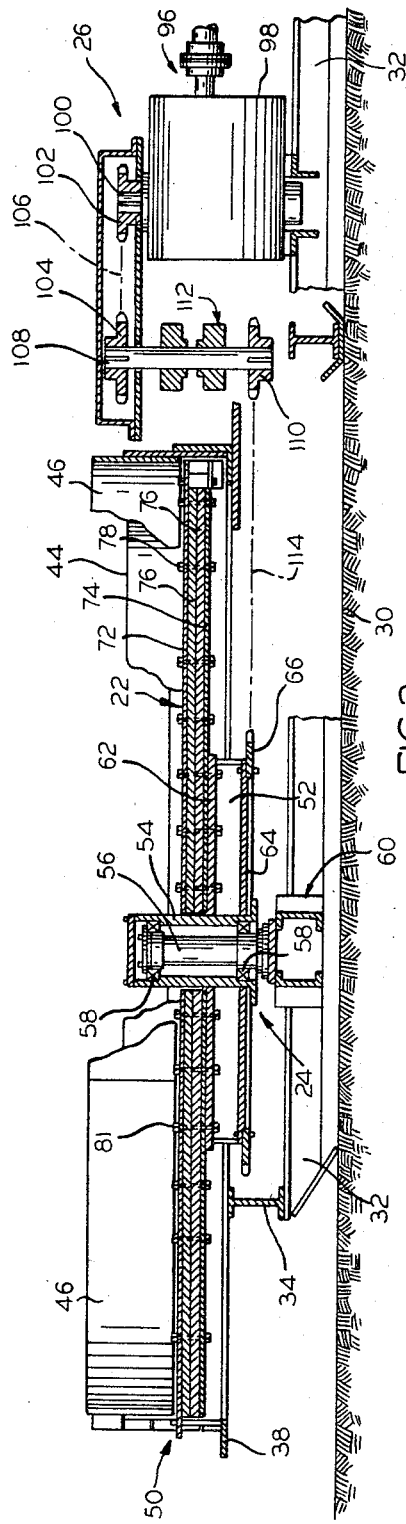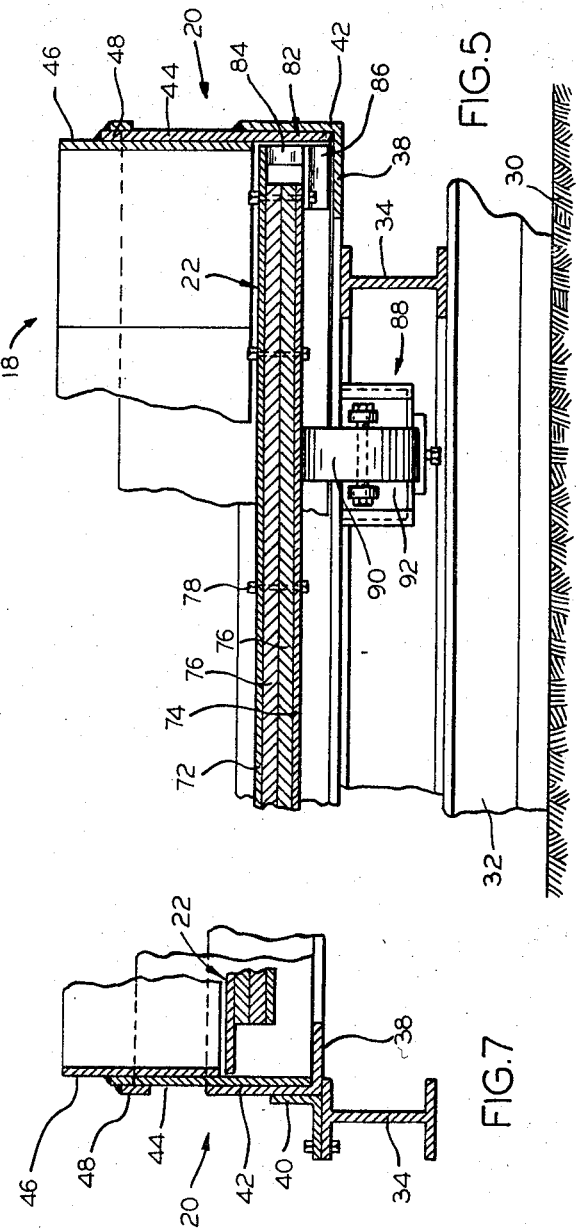

INVENTOR
ANTHONY R. BIEDESS
BY *Parker & Carter*
ATTORNEYS

United States Patent Office 3,411,676
Patented Nov. 19, 1968

3,411,676
LOAD TRANSFER DEVICE
Anthony R. Biedess, Chicago, Ill., assignor to Westinghouse Air Brake Company, Pittsburgh, Pa., a corporation of Pennsylvania
Filed July 19, 1967, Ser. No. 654,620
9 Claims. (Cl. 222—410)

ABSTRACT OF THE DISCLOSURE

A high capacity load transfer device having a turntable assembly adapted to accept large surge loads of material from a batch carrier and to feed the material onto continuous carry away means at a generally uniform reduced rate. The turntable assembly, being of large diameter, is designed for maximum strength and minimum weight with a knock-down construction to facilitate transporting the device.

Background of the invention

This invention comprises a large version of the load transfer device shown in U.S. Patent 3,355,005, issued Nov. 28, 1967. This smaller unit has performed exceedingly well in mine installations where small capacity batch carriers or shuttle cars were used; however, with the use of large shuttle cars, the smaller transfer device cannot accept the surge loads without spillage or being swamped. If the rate of discharge by the shuttle car is slowed to match the removal or feed rate onto the belt conveyor carry away means the shuttle car is tied up for too long a time and many of the advantages of the larger shuttle cars are lost.

In designing a rotary load transfer device with a turntable and hopper assembly adapted to handle large surge loads, several problems developed.

First, a turntable disc would be extremely heavy and costly if it were made of solid steel. Other materials, however, do not offer the beam strength and wear resistance needed.

Second, the power requirements would be large to rotate a massive solid steel disc.

Third, movement of the machine along the narrow mine passageways, suggested a dismantleable design, including dismantling the turntable disc.

Summary of invention

A strong lightweight turntable disc represents the key to success in this invention. Accordingly, a large diameter turntable disc is provided, comprising a segmented sandwich construction in which a comparatively thin steel top and bottom plate overlay a plywood core. The plywood core may be formed of several layers, with each split along a diametric line. Correspondingly, the top and bottom steel plates are also split along a diametric line and assembled in a stacked arrangement with the core segments, in such a way that none of the split lines are in vertical alignment.

For example, in a turntable disc having four layers, two plywood layers and two covering steel plate layers, the split lines are positioned so that each split line is spaced 45° offset from any other split line, in order to provide maximum strength for the turntable assembly.

The four layers are securely bolted together forming a rigid unitary disc, weighing only 1/2 as much as a comparable size all-steel disc would weigh. More driving power is thus made available to move the material rather than being wasted in rotating deadweight.

Accordingly, a primary object of this invention is to provide a loading apparatus, having a large receiving capacity to accept surge loads of material from a batch carrier and to feed the material onto continuous carry-away means at a uniform reduced rate.

Another object is to provide a rotary transfer device having a lightweight turntable disc with sufficient storage capacity to accept large batch loads and feed the material into a conveyor and wherein power requirements may be more fully utilized to convey the material.

Yet another object is to construct a large lightweight turntable disc for a load transfer device in which the disc may be easily disassembled and reduced in size for transporting the device in the mine.

Still another object is to construct a large lightweight turntable disc for a load transfer device providing a strong durable element comprising a series of segmented components, assembled in a sandwich fashion.

Other objects and advantages of the invention will become apparent upon reading the following description of the invention.

The invention is illustrated more or less diagrammatically in the accompanying drawings wherein:

FIGURE 3 is a cross-sectional view taken along line 3—3 of FIGURE 1;

FIGURE 5 is cross-sectional view taken along line 5—5 of FIGURE 1;

FIGURE 7 is a cross-sectional view taken along line 7—7 of FIGURE 1.

Description of the preferred embodiment

Figure 1:
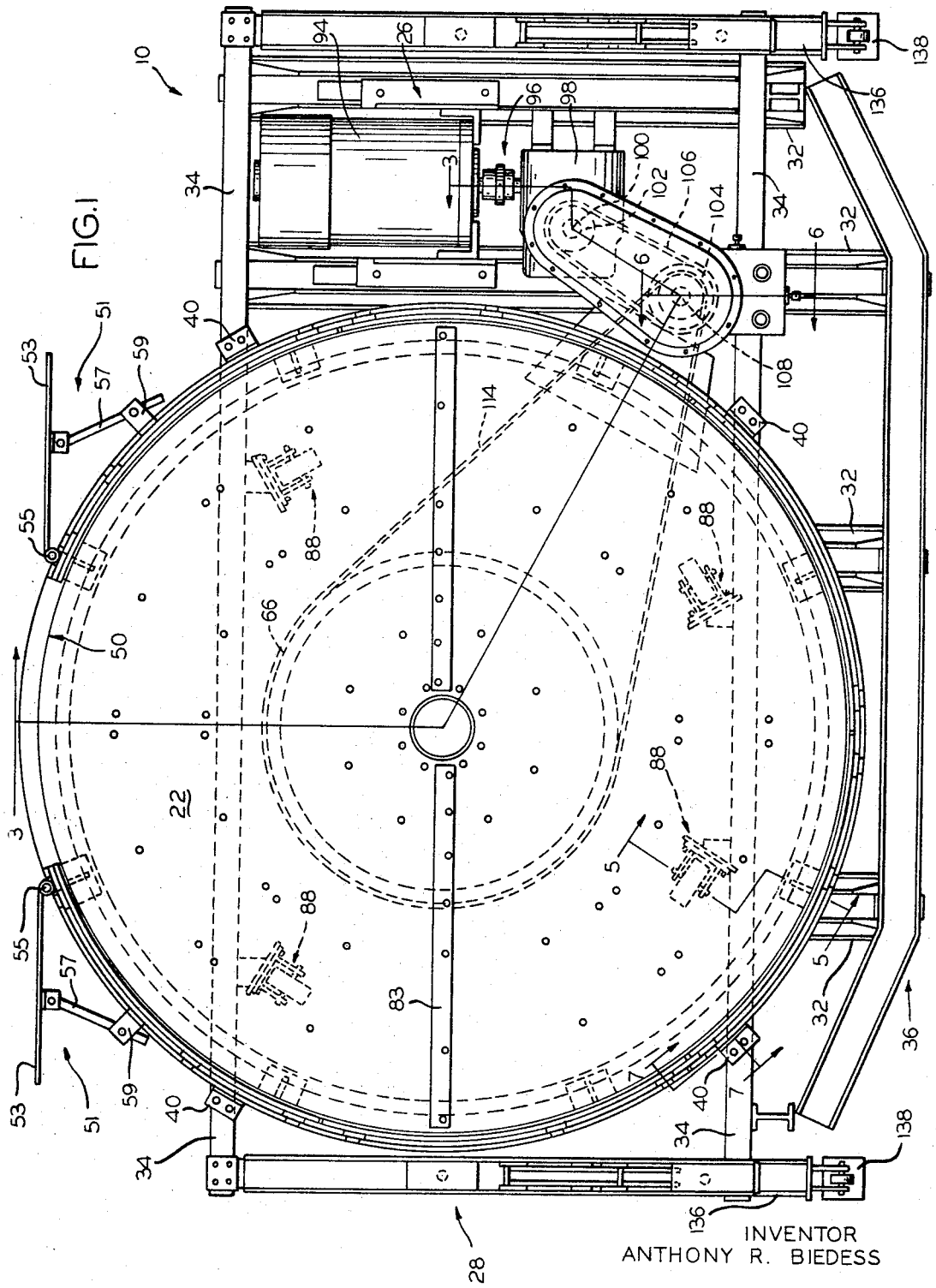
FIGURE 1 is a plan view of a high capacity load transfer device having the turntable disc structure of this invention.

Like reference numerals will be used to refer to like parts throughout the following description of the drawings.

Figure 2:
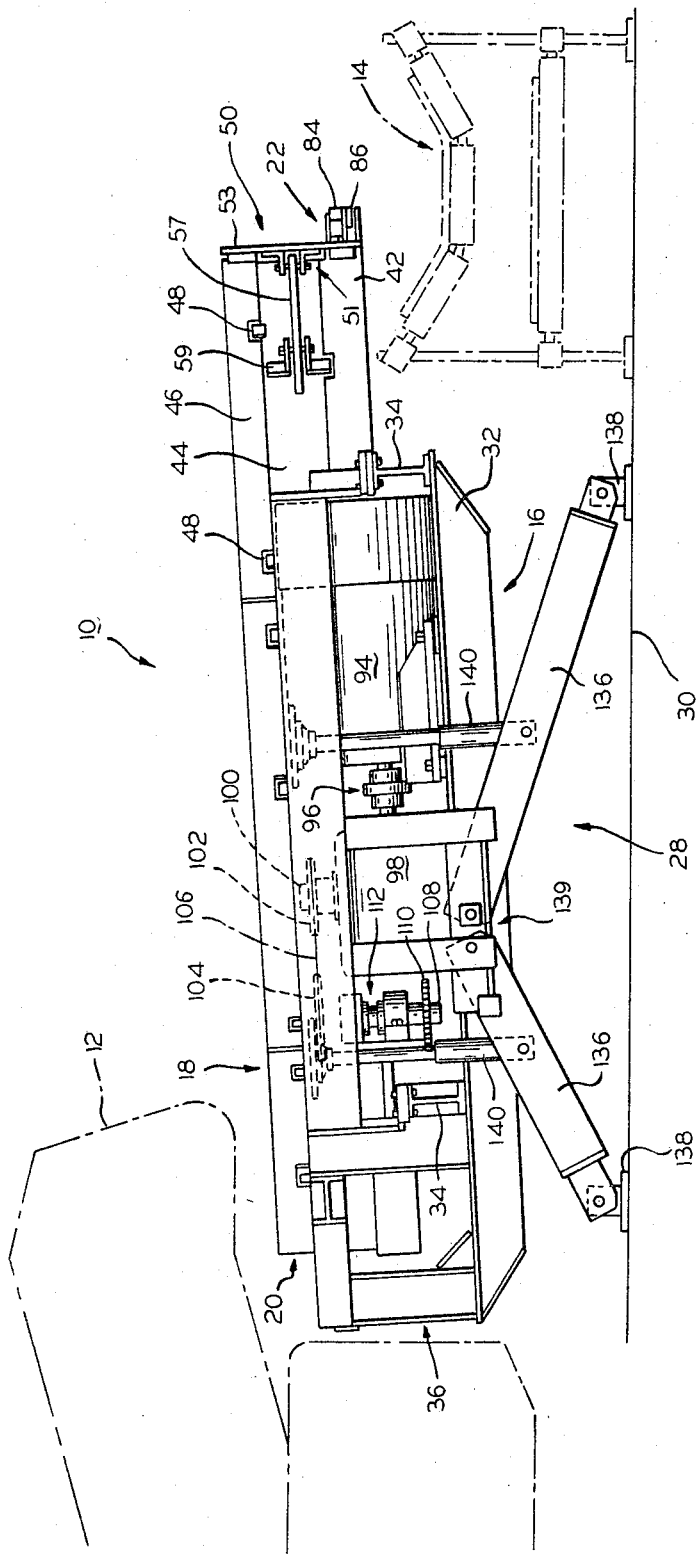
FIGURE 2 is a side elevational view of the load transfer device of FIGURE 1.

Referring now to FIGURE 2, a large version of a load transfer device of the type shown in pending patent application Ser. No. 444,966, filed Apr. 2, 1965, is shown generally at 10 in position to receive surge loads of material from a batch carrier or shuttle car 12 and discharge the material at a generally uniform reduced rate onto material removal means such as belt conveyor 14. For details of the load transfer device 10 additional to those appearing hereinafter, reference is made to the above-mentioned patent application.

The load transfer device 10 comprises a suitable frame 16; a generally upwardly opening hopper 18 carried by the frame and formed by a circular sidewall 20 and a disc 22 carried by a rotatable turntable assembly 24; turntable drive means 26; and suitable jacking means 28 to elevate and tilt the load transfer device 10 to the desired degree relative to a ground support surface 30 as shown in FIGURE 2.

The frame 16 may be constructed in any suitable manner and in this instance includes four spaced, generally parallel, lower frame members 32 welded or otherwise suitably secured to two transversely extending upper frame members 34. A suitable rear bumper frame 36 may be provided to protect the hopper 18 from impact with the shuttle car 12.

The hopper sidewall 20 is supported by an inwardly extending radial flange 38 which rests on upper frame member 34 and is attached thereto by brackets 40 as shown in FIGURE 7. The flange 38 may be formed by a circular member 42 having an L-shaped cross-section with one leg forming the flange 38 and the other leg forming a portion of the circular sidewall 20. A plurality of bent plates 44 may be welded or otherwise suitably secured to the sidewall forming leg of member 42 to provide a higher sidewall. The sidewall may be further heightened using a plurality of hopper extension members 46 adapted to telescope within and extend above the sidewall plates 44. Each extension member 46 may be provided with a plurality of hangers 48 adapted to hook over the sidewall plates 44 and support the extension member 46. The sidewall 20 is formed with a suitable opening 50 through which the material is discharged from the hopper 18.

Structure for directing the flow of material discharged from the load transfer device 10 is shown generally at 51 as including flaps 53, pivotally connected to the sidewall plates 44 adjacent to the discharge opening 50 by hinge pins 55. Each flap may be held in the desired position by a suitable arm 57 which is pivotally attached at one end to the flap 53 and at the other end to a suitable bracket 59 extending from the sidewall plate 44. For further details of the flow directing structure 51, reference is made to pending patent application Ser. No. 444,966, filed Apr. 2, 1965.

The turntable assembly 24, as best shown in FIGURE 3, includes a wheel 52 rotatably mounted by a hub 54 to a generally vertically extending shaft 56 through axially spaced bearings 58. The shaft 56 is welded or otherwise suitably secured at one end to suitable supporting structure extending between structural members 32 as at 60. The turntable wheel 52 is formed with an upper turntable disc supporting surface 62 and a lower surface 54 having a sprocket 66 attached thereto.

The turntable disc is shown generally at 22 as being of a multilayer laminate or sandwich construction and having a thin, wear resistant, top layer 72 and bottom layer 74 overlying core layers 76. The top layer 72, bottom layer 74 and core layers 76 are suitably secured together to form one composite multilayer structure by fasteners 78.

Figure 4:
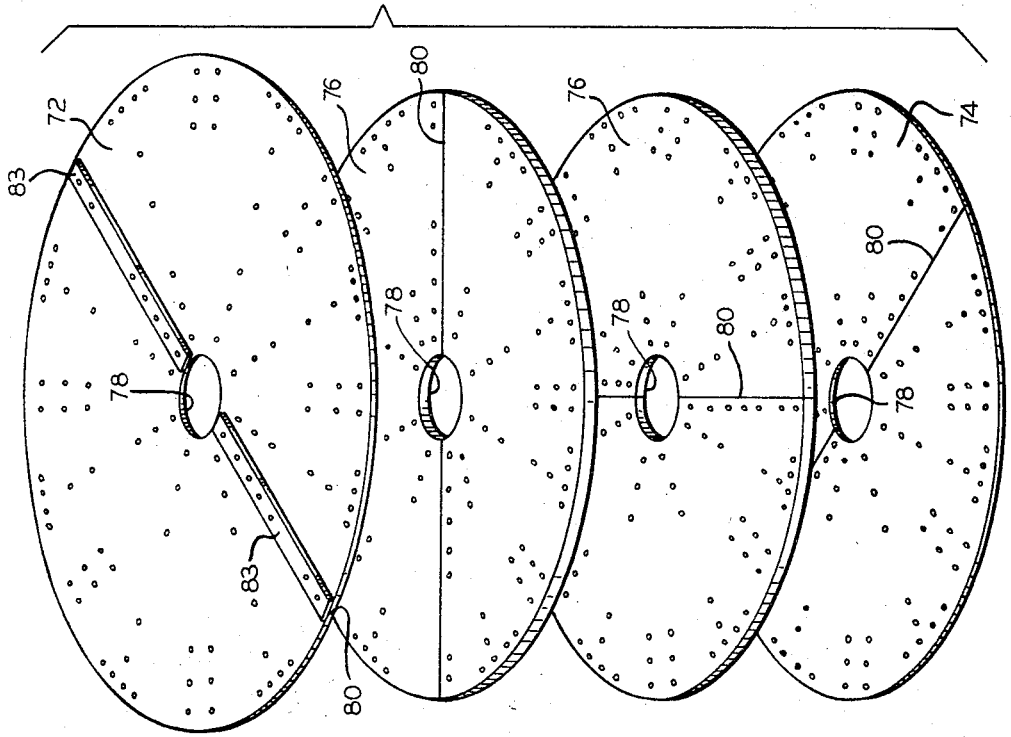
FIGURE 4 is an exploded view of one embodiment of the turntable disc structure of this invention.

As shown in FIGURE 4, the layers 72, 74, and 76 are circular in shape and are formed with a clearance hole 78 adapted to allow passage of the hub 54 threrethrough. Each layer is shown split along a diametric line 80 into two segments. When assembled, the disc forming layers are arranged so that none of the split lines 80 are in vertical alignment. For example, in the four layer disc structure shown in FIGURE 4, each split line is offset 45° from any other split line.

The top and bottom layers 72 and 74 are preferably made from thin steel and the core layers 76 are preferably made using relatively thicker plywood. Although two core layers 76 have been shown, it should be understood that one layer, or more than two layers may be effectively utilized. Further, although each layer has been shown split along one diametric line 80, it should be understood that each layer may be segmented into more than two parts and may be split along lines other than diametric lines.

The turntable disc is mounted on surface 62 of the turntable wheel 52 with suitable fasteners 81 for rotation with the turntable assembly 24. The surface 62 is preferably positioned relative to bearings 58 so that the disc is generally equally spaced between the bearings, although it may be constructed otherwise.

As best shown in FIGURE 3, the top layer 72 is formed with an outside diameter slightly lager than the outside diameter of the bottom and core layers 74 and 76 and extends under the bottom surface of the hopper extension members 46 when mounted to the wheel 52.

A plurality of narrow, generally radially disposed paddles 83 may be attached to the top layer 72 to reduce the arcuate slippage of the material as it is transported by the turntable disc 22 and to insure flatness to the turntable surface. Such material slippage is further eliminated by the heads of the fasteners 78 and 81 which extend above the top layer 72 and form a rough transfer or conveying surface.

A plurality of generally L-shaped wiper blades having a vertical blade portion 84 and a radial blade portion 86 may be attached at spaced intervals to the periphery of the turntable disc 22 as at 82 in FIGURE 5 to continuously sweep the fines out of the hopper and thereby eliminate clogging.

A plurality of roller assemblies, as at 88 in FIGURE 5, may be provided to give additional support to the turntable disc 22. Each roller assembly has a roller 90 which supportingly engages the wear resistant bottom layer 74 of the turntable disc 22 and is rotatably mounted to a bracket 92. Each roller mounting bracket is adjustably mounted to the upper frame member 34 as shown in FIGURE 5. As shown in FIGURE 1, the disc supporting roller assemblies 88 are radially spaced from the shaft 56 and mounted so that the rotational axis of the roller 90 generally intersects the rotational axis of the turntable assembly 24 and turntable disc 22.

The turntable disc 22 may be rotatably driven by any suitable driving means. For example, a motor 94 may be connected in driving engagement as at 96 with a suitable speed reducer 98 having an output shaft 100 carrying a drive sprocket 102 which is connected to a sprocket 104 by a link chain 106. The sprocket 104 is suitably mounted at one end of a shaft 108. The shaft 108 has a second sprocket 110 suitably mounted at its other end and is rotatably supported between the sprockets 108 and 110 by a pillow block assembly 112. The drive sprocket 110 is then connected to the turntable sprocket 66 by a link chain 114 as shown in FIGURE 3 to thereby complete the driving connection between the motor 94 and the turntable disc 22.

The motor 94 and speed reducer 98 may be mounted to the sub-frame 16 using suitable brackets as shown in FIGURES 1, 2 and 3.

Figure 6:
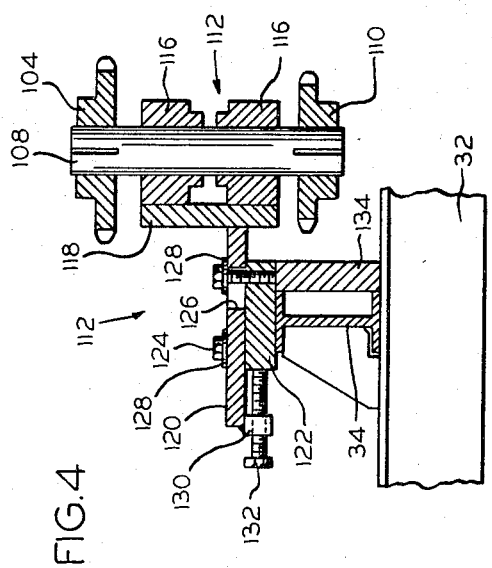
FIGURE 6 is a cross-sectional view taken along line 6—6 of FIGURE 1.

The pillow block assembly 112, as best seen in FIGURE 6, includes spaced pillow blocks 116 which are welded or otherwise suitably attached to a generally vertically extending plate 118, which, in turn, is suitably attached to a generally horizontally extending plate 120. The plate 120 is adjustably attached to a support block 122 by fasteners 124 extending through mounting holes 126 formed in the plate 120. The mounting holes 126 are formed sufficiently large to enable two axis adjustments of the plate 120. A washer 128 may be provided under the head of each fastener 124 to enable use of the enlarged mounting holes 126. The plate 120 may be provided with one or more depending threaded lugs 130 for receiving a threaded member 132 adapted to engage the mounting block 122 to enable accurate positioning of the plate 120 thereon. The mounting block 122 may be welded or otherwise suitably attached to the upper frame member 34 and may be additionally supported by a generally vertically extending block 134.

Suitable jack means 28 may be attached at each side of the sub-frame 16 to elevate the load transfer device 10 and provide any desired tilt or inclination to the turntable disc 22 with respect to the ground support surface 30 as shown in FIGURE 2. The jacking means 28 may comprise a pair of legs 136 pivotally attached at one end to a ground engaging foot member 138 and at the other end pivotally attached to the sub-frame 16 by a suitable structure as at 139. Each leg 136 may be provided with a hydraulic cylinder or mechanical jack 140 pivotally attached at one end to its respective leg 136 and at the other end to the sub-frame 16.

The use, operation, and function of the invention are as follows:

A batch carrier or shuttle car 12 approaches the bumper frame 36 of the load transfer device 10 and rapidly discharges its load of material into the hopper 18 and onto the rotating turntable disc 22. The centrifugal force imparted to the material deposited on the turntable disc 22 causes the material to move radially outwardly. When the material reaches the opening 50 formed in the sidewall 20, it is centrifuged out of the hopper 18 and onto the belt conveyor 14. The rotational speed of the turntable disc 22 is adjusted such that its peripheral tangential speed is approximately equal to the linear speed of the belt conveyor 14. The paddles 83 and the heads of the fasteners 78 and 81 operate to substantially eliminate any arcuate slippage of the material with respect to the turntable disc 22.

The material directing structure 51 acts to prevent material from dropping off the belt conveyor 14 and, in effect, insures that the material discharge from opening 50 is deposited onto the center area of the conveyor belt 14.

The turntable disc may be rotatably driven by a motor 94 through a speed reducer 98 and a suitable chain drive and sprocket arrangement as shown in FIGURE 3 and previously described.

The turntable disc 22 is of a segmented laminated construction in which a comparatively thin steel top and bottom plate 72 and 74 overlay a plywood core 76. The plywood core 76 may be formed of several layers. The top, bottom, and core layers are split along a diametric line and are assembled so that none of the split lines are in vertical alignment to thereby provide maximum strength for the turntable assembly while enabling the turntable disc to be reduced in size upon disassembly to facilitate transporting the apparatus. The various disc layers are securely fastened together to form a lightweight, rigid, unitary turntable disc having wear resistant outer surfaces and great load bearing characteristics. Such a strong, lightweight structure permits the load transfer device 10 to have a large turntable disc for receiving surge loads of material from the batch carrier 12 and enables the use of a motor 94 having less power per pound of material transported since there is less rotating dead weight.

The sidewall 20, encircles the turntable disc 22 and forms a hopper 18 having a large storage capacity. The storage capacity of the hopper 18 may be increased by heightening the sidewall 20 using hopper extension members 46.

The hopper extension members 46 telescope within the sidewall plates 44 and are supported by hangers 48 which hook over the plates 44. Accordingly, the hopper extension members 46 are free to slide upwardly, as viewed in FIGURE 5, to free any material which might otherwise become jammed or wedged between the lower edge of the extension member 46 and the turntable disc conveying surface.

Although a preferred embodiment of the invention has been illustrated and disclosed, it will at once be apparent to those skilled in the art that various modifications may be made within the spirit of the invention. Accordingly, it is intended that the scope of the invention be limited not by the foregoing exemplary description, but solely by the scope of the hereinafter appended claims, when interpreted in light of the pertinent prior art.

I claim:

1. In a load transfer device adapted to receive surge loads of material on a rotating conveying surface and centrifugally discharge the material at a generally uniform reduced rate and of the type having a frame, a turntable assembly rotatably carried by said frame, a sidewall encircling said rotating conveying surface, and means for rotatably driving said turntable assembly, the improvement comprising:
a laminated turntable disc adapted for rotation with said turntable assembly and forming said conveying surface, said laminated disc including a circular generally planar thin wear resistant top layer spaced from and secured to a circular generally planar thin wear resistant bottom layer by and through a circular generally planar relatively thick lightweight core layer to thereby provide a strong, wear resistant, lightweight turntable disc.

2. The improved device of claim 1 further characterized in that said top layer and bottom layer are formed using steel and said core layer is formed using plywood.

3. The improved device of claim 1 further characterized in that each layer of said disc structure is split into at least two segments, with the segments of each layer of said disc structure oriented relative to the segments of the other layers so that none of said split lines are in vertical alignment.

4. The improved device of claim 3 further characterized in that said disc layers are removably secured together to thereby provide a strong, wear resistant, lightweight, turntable disc that can be disassembled and easily transported.

5. A material transfer device including;
a frame,
a turntable assembly rotatably carried by said frame,
means carried by said frame for rotatably driving said turntable assembly,
a circular wall radially spaced from and generally concentric with said turntable assembly rotational axis, with said circular wall being discontinuous along a portion of its arc to thereby form an opening through which the material may be discharged, and
a conveying disc generally concentrically carried by said turntable assembly for rotation therewith within said circular wall in close spaced relationship to said circular wall to form a generally upwardly opening hopper for receipt of the material to be transferred, said conveying disc comprising a top circular generally planar layer, a circular generally planar bottom layer, and at least one circular generally planar core layer intermediate said top and bottom layer, with said top and bottom layer being a strong, thin, wear resistant material and said core layer being a relatively thick, lightweight material.

6. The structure of claim 5 further characterized in that said top and bottom layer are formed using steel and said core layer is formed using plywood.

7. The structure of claim 5 further characterized in that said circular sidewall includes;
a first wall portion secured to said frame,
a plurality of extension members having an upper edge and a lower edge,
hook means carried by each said extension member for engagement with said first wall portion to slideably support said extension member in a position telescoped within said first wall portion with its lower edge in close spaced relationship to said top layer of said conveying disc.

8. The structure of claim 5 further characterized in that each layer of said conveying disc is split into at least two segments, with the segments of each layer of said conveying disc oriented relative to the segments of the other layers so that none of the split lines are in vertical alignment.

9. The structure of claim 8 further characterized in that said layers are removably secured together to provide a unitary strong, wear resistant, lightweight conveying disc which is easily disassembled and transported.

References Cited

UNITED STATES PATENTS

| | | | |
|---|---|---|---|
| 3,355,005 | 11/1967 | Craggs et al. | 198—209 X |
| 3,360,104 | 12/1967 | Winfield | 198—209 X |

ROBERT B. REEVES, *Primary Examiner.*

HADD S. LANE, *Assistant Examiner.*